(12) United States Patent
Xiong et al.

(10) Patent No.: US 11,903,034 B2
(45) Date of Patent: Feb. 13, 2024

(54) AGGREGATION INDICATION FOR UPLINK TRANSMISSION DURING RANDOM ACCESS CHANNEL PROCEDURES

(71) Applicant: Intel Corporation, Santa Clara, CA (US)

(72) Inventors: Gang Xiong, Beaverton, OR (US); Debdeep Chatterjee, San Jose, CA (US); Yingyang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 17/180,034

(22) Filed: Feb. 19, 2021

(65) Prior Publication Data

US 2021/0251016 A1 Aug. 12, 2021

Related U.S. Application Data

(60) Provisional application No. 63/066,055, filed on Aug. 14, 2020, provisional application No. 62/978,684, filed on Feb. 19, 2020.

(51) Int. Cl.
*H04W 74/08* (2009.01)
*H04W 74/00* (2009.01)
(Continued)

(52) U.S. Cl.
CPC ....... *H04W 74/0833* (2013.01); *H04L 1/0061* (2013.01); *H04W 72/1268* (2013.01); *H04W 72/23* (2023.01); *H04W 74/008* (2013.01)

(58) Field of Classification Search
CPC ............ H04W 74/0833; H04W 72/23; H04W 72/1268; H04W 74/008; H04L 1/0061
See application file for complete search history.

(56) References Cited

U.S. PATENT DOCUMENTS 10,278,207 B2 * 4/2019 Lee ................. H04L 1/0025
11,019,623 B2 * 5/2021 Lee ................. H04W 74/0833
(Continued)

FOREIGN PATENT DOCUMENTS

EP     3799505 A1 *  3/2021
WO  WO-2018175596 A1 *  9/2018 ........... H04L 5/0005
WO  WO-2019224876 A1 * 11/2019

OTHER PUBLICATIONS

"ETSI TS 138 214", 5G;NR;Physical layer procedures for data(3GPP Ts 38.214 version 15.3.0 Release 15), (Oct. 2018), 99 pgs.

*Primary Examiner* — Jael M Ulysse
(74) *Attorney, Agent, or Firm* — Schwegman Lundberg & Woessner, P.A.

(57) ABSTRACT

Systems for providing coverage enhancement for Msg 3 PUSCH and PUCCH carrying the HARQ-ACK for Msg4 of PRACH initial access are described. The gNB provides a 2-bit aggregation factor for transmission of the Msg3 PUSCH in an RAR UL grant field. The PUSCH frequency resource allocation field is limited to 12 bits so that the RAR has an overall number of bits that is the same as an RAR that does not contain the aggregation factor. A default PUSCH TDRA table includes a field to indicate a repetition level for Msg3 PUSCH transmission. For retransmissions, fields in DCI format 0_0 are repurposed to indicate an aggregation factor. Inter-slot frequency hopping may be configured by higher layers. Different PRACH resources are used to indicate UE coverage status.

15 Claims, 5 Drawing Sheets

(51) Int. Cl.
*H04L 1/00* (2006.01)
*H04W 72/1268* (2023.01)
*H04W 72/23* (2023.01)

(56) References Cited

U.S. PATENT DOCUMENTS

| | | | | |
|---|---|---|---|---|
| 2016/0100422 | A1* | 4/2016 | Papasakellariou | H04L 1/1822 |
| | | | | 370/329 |
| 2017/0273113 | A1* | 9/2017 | Tirronen | H04W 4/70 |
| 2017/0311344 | A1* | 10/2017 | Lee | H04W 74/0833 |
| 2018/0279327 | A1* | 9/2018 | Ying | H04W 72/0446 |
| 2018/0324641 | A1* | 11/2018 | Tsai | H04W 72/04 |
| 2018/0368117 | A1* | 12/2018 | Ying | H04L 1/0061 |
| 2019/0215872 | A1* | 7/2019 | Park | H04W 52/0216 |
| 2019/0342921 | A1* | 11/2019 | Loehr | H04L 5/0053 |
| 2020/0059390 | A1* | 2/2020 | Zhang | H04L 1/0007 |
| 2020/0107277 | A1* | 4/2020 | Jeon | H04W 52/228 |
| 2020/0120650 | A1* | 4/2020 | Yi | H04W 72/542 |
| 2020/0120709 | A1* | 4/2020 | Bergquist | H04W 76/11 |
| 2020/0146032 | A1* | 5/2020 | Bae | H04L 1/1819 |
| 2020/0383134 | A1* | 12/2020 | Tirronen | H04B 7/0626 |
| 2020/0404650 | A1* | 12/2020 | Chen | H04L 1/08 |
| 2021/0076384 | A1* | 3/2021 | MolavianJazi | H04B 17/318 |
| 2021/0136830 | A1* | 5/2021 | Lin | H04W 72/23 |
| 2021/0219278 | A1* | 7/2021 | Hu | H04W 72/1268 |
| 2021/0219322 | A1* | 7/2021 | Chin | H04L 1/1896 |
| 2021/0274556 | A1* | 9/2021 | Park | H04W 24/10 |
| 2021/0329703 | A1* | 10/2021 | Yang | H04L 5/001 |
| 2022/0029659 | A1* | 1/2022 | Liu | H04B 1/7143 |
| 2022/0104187 | A1* | 3/2022 | Zhou | H04L 1/1822 |

\* cited by examiner

AGGREGATION INDICATION FOR UPLINK TRANSMISSION DURING RANDOM ACCESS CHANNEL PROCEDURES

PRIORITY CLAIM

This application claims the benefit of priority to U.S. Provisional Patent Application Ser. No. 62/978,684, filed Feb. 19, 2020, and U.S. Provisional Patent Application Ser. No. 63/066,055, filed Aug. 14, 2020, each of which is incorporated herein by reference in its entirety.

TECHNICAL FIELD

Embodiments pertain to wireless communications in 5G, or new radio (NR) systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/$5^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
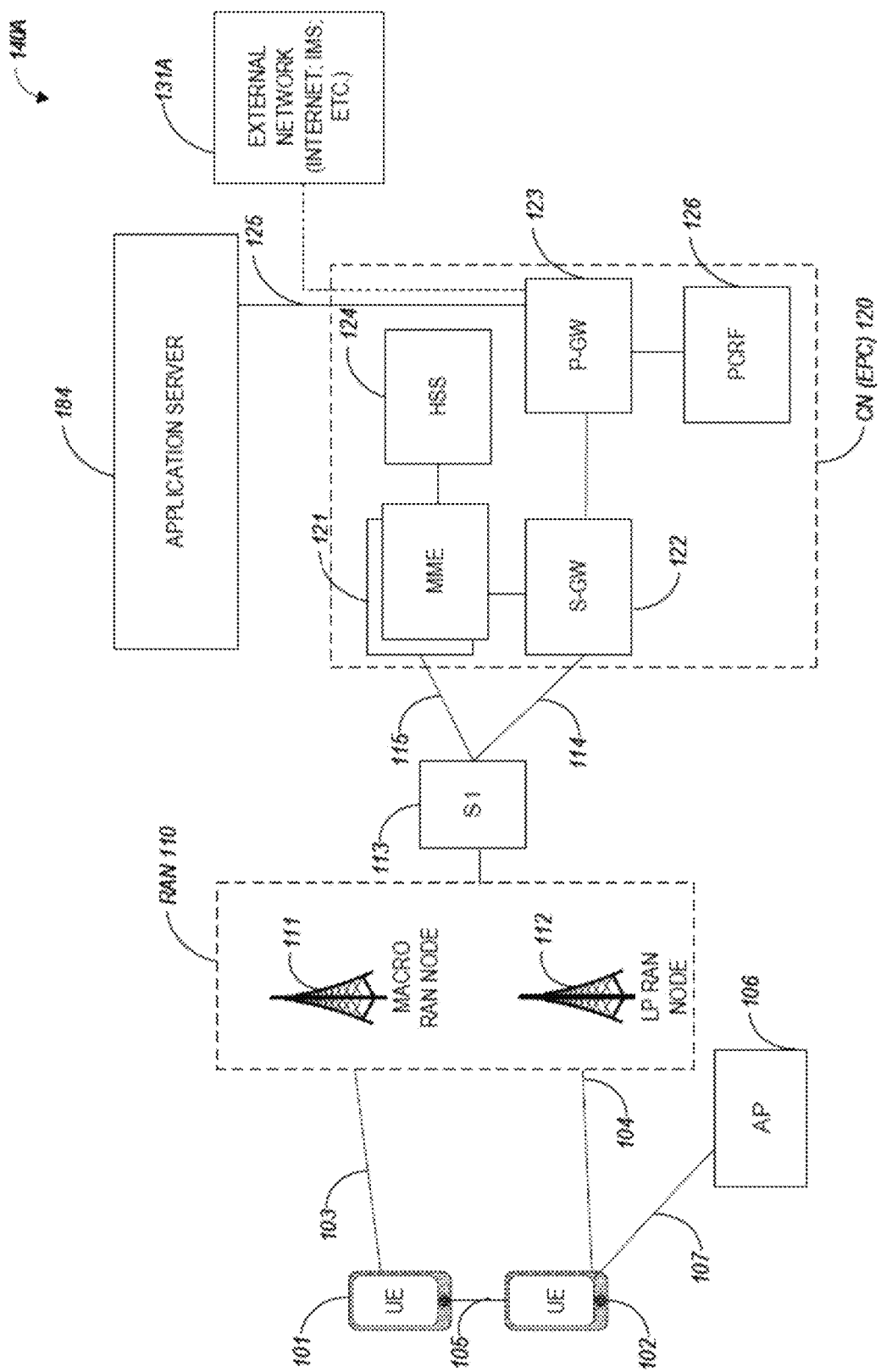
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells). e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-IC). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and extremal networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
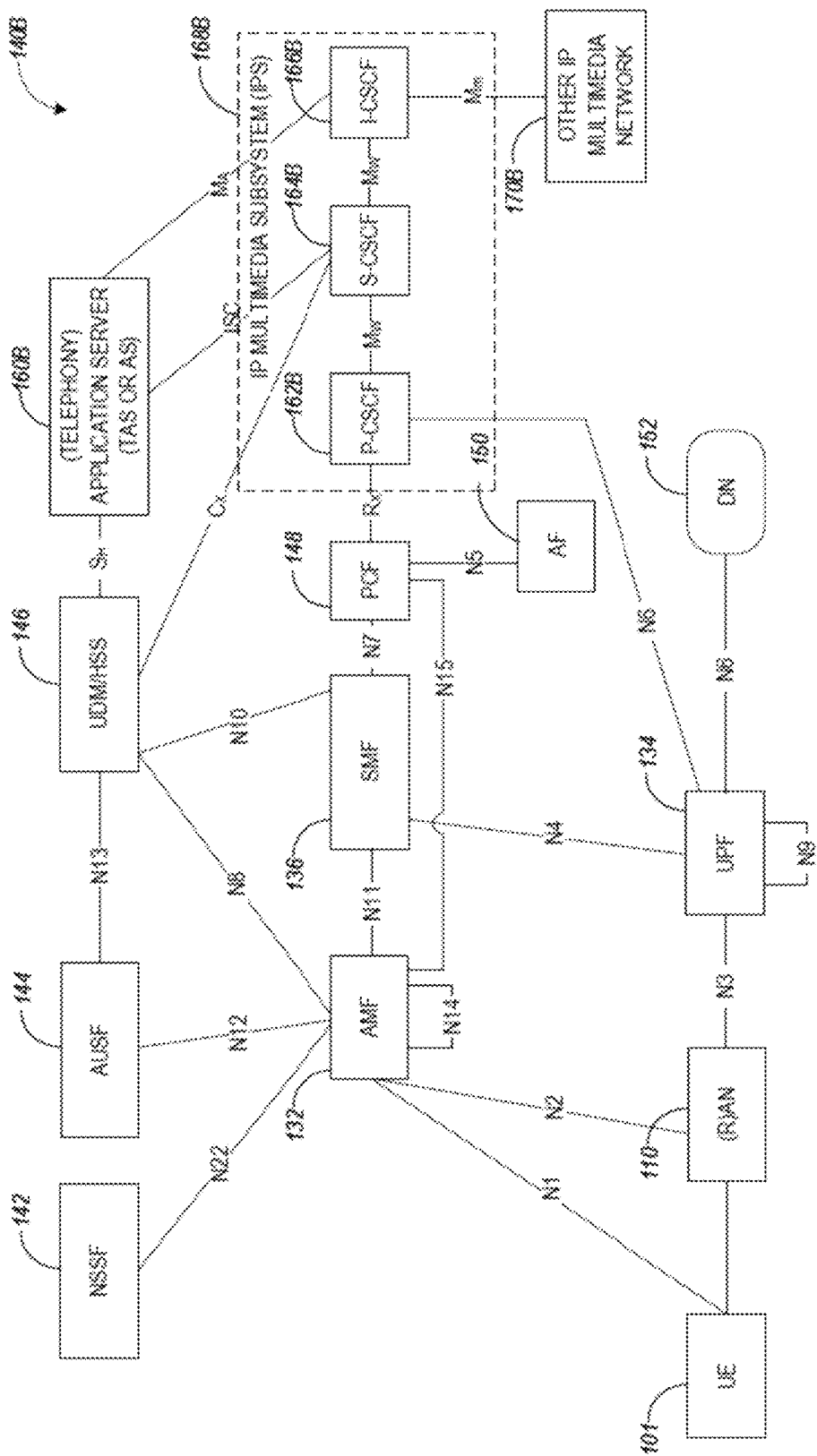
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically. UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (1-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operators service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
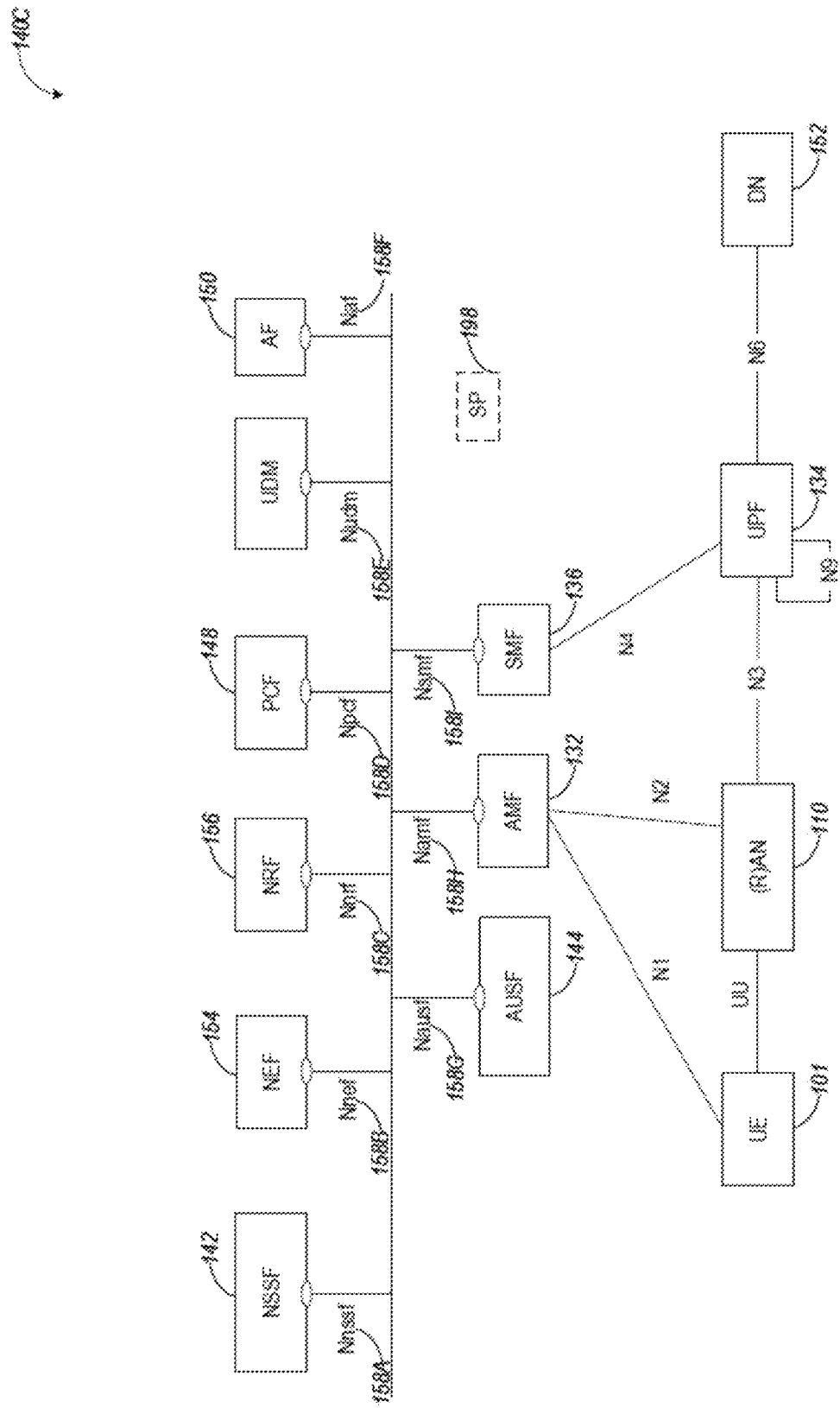
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
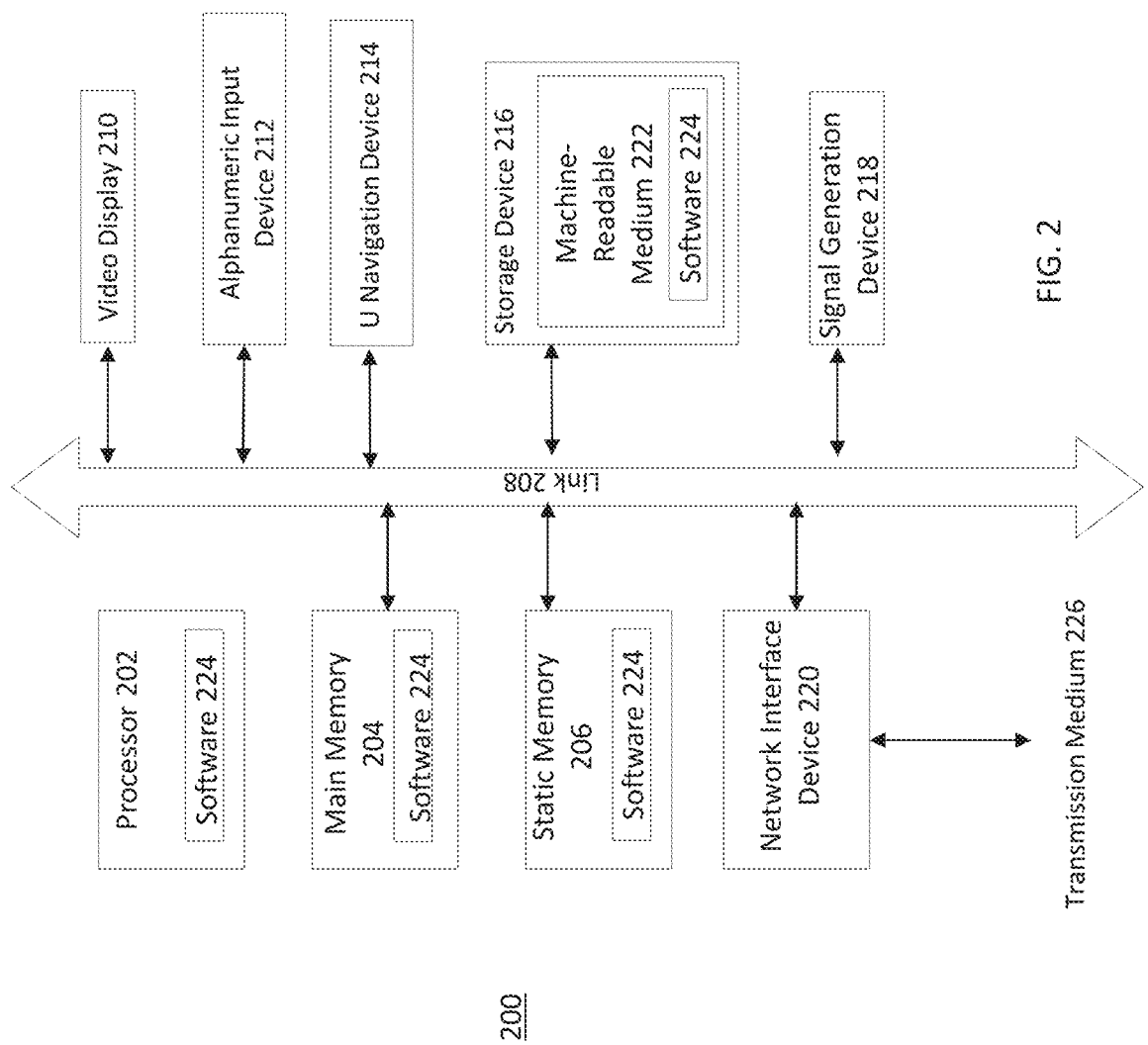
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM): and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Mobile communication has evolved significantly from early voice systems to the current highly sophisticated integrated communication platform. The 5G (or new radio (NR)) wireless communication system is intended to provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR evolution may be based on 3GPP LTE-Advanced (LTE-A) with additional potential new Radio Access Technologies (RATs) to provide better, simple and seamless wireless connectivity solutions. NR may enable everything connected by wireless and deliver fast, rich contents and services.

For cellular systems, coverage is one factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink (UL) coverage is the bottleneck for system operation considering the low transmit power at the user equipment (UE) side.

Figure 3:
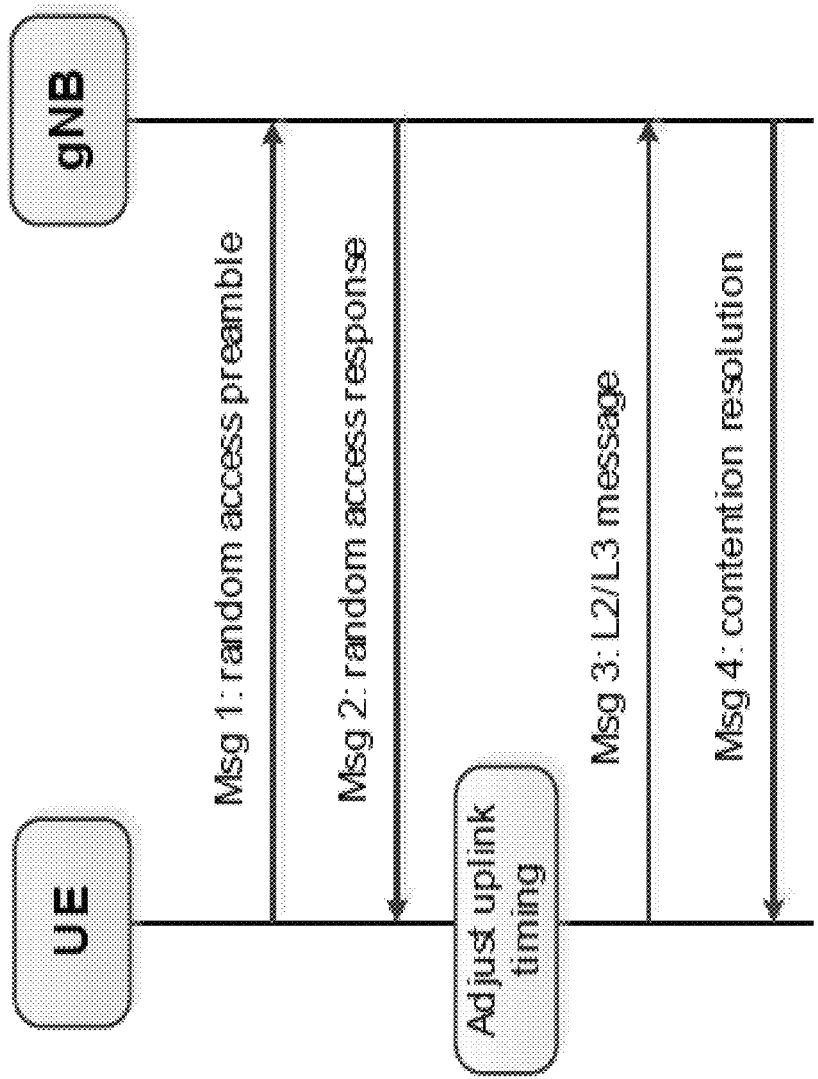
FIG. 3 illustrates a random access channel (RACH) procedure in accordance with some embodiments.

FIG. 3 illustrates a random access channel (RACH) procedure in accordance with some embodiments. The RACH procedure provides initial network access to a UE. In the first step, a UE transmits physical random access channel (PRACH) in the uplink by randomly selecting a preamble signature, which would allow a gNB to estimate the delay between the gNB and UE for subsequent UL timing adjustments. Subsequently, in the second step, the gNB provides a random access response (RAR) which carries timing advanced (TA) command information and an uplink grant for the uplink transmission (L2/L3 —Msg 3) in the third step. The UE expects to receive the RAR within a time window, of which the start and end are configured by the gNB via a system information block (SIB).

For the RACH procedure shown in FIG. 4, the L2/L3 transmission is transmitted once. However, various embodiments herein may aid in coverage enhancement to help with proper system operation, particularly given that initial access is the first step for a UE to access the network. However, uplink coverage is typically the bottleneck considering the low transmit power at the UE side. In this case, certain mechanisms to improve the coverage of Msg3 and a PUCCH carrying hybrid automatic repeat request —acknowledgement (HARQ-ACK) of Msg4 transmission should be considered.

Among other things, the embodiments herein may be directed to the indication of aggregation factors for uplink transmission during the RACH procedure. More specifically, embodiments may be directed to: Coverage enhancement for Msg3 PUSCH and Coverage enhancement for PUCCH carrying HARQ-ACK of Msg4. Note that in this disclosure, "repetition level", "number of repetitions", "number of slots", "multiple slots" and "aggregation factor" are exchangeable terms.

Coverage Enhancement for Msg3 PUSCH

As above, for the 4-step RACH, coverage enhancement may be used for proper system operation. Embodiments for coverage enhancement for a Msg3 PUSCH are provided as follows. Note that in the following embodiments, a Msg3 PUSCH repetition may refer to a Msg3 PUSCH with a repetition scheduled by a RAR UL grant and/or fallback RAR UL grant or a Msg3 PUSCH retransmission with a repetition that is scheduled by a DCI format 0_0 with Cyclic Redundancy Error (CRC) scrambled by a temporary cell— Radio Network Temporary Identifier (TC-RNTI).

In one embodiment, a repetition level or aggregation factor or the number of slots for a Msg3 PUSCH transmission may be configured by higher layers via NR minimum system information (MSI). NR remaining minimum system information (RMSI), NR other system information (OSI) or radio resource control (RRC) signaling, or indicated in a random access response (RAR), or a combination thereof.

In another embodiment, a set of repetition levels for a Msg3 PUSCH transmission can be configured by the RMSI or SIB1, and one field in the RAR can be used to indicate which repetition level is applied from the set of values.

In one example, a set of repetition levels can be configured as {2, 4, 8, 16} and 2-bit indicator in the RAR may be used to indicate which repetition level is applied from the set of values.

In one option, to maintain the same size of RAR, some fields in RAR can be repurposed to indicate the repetition level of a Msg3 PUSCH transmission. As a further extension, the repetition level of a Msg3 PUSCH transmission may be indicated via existing RAR UL grant. In this case, the size of RAR UL grant can be kept the same.

In one example, assuming a 2-bit indicator for the repetition level of the Msg3 PUSCH transmission, the number of bits for the modulation and coding scheme (MCS) field may be reduced from 4 to 2. In other words, only 4 rows of MCS table can be used for the Msg3 PUSCH transmission. As shown in the Table 1, the repetition level of the Msg3 PUSCH transmission is explicitly indicated in the RAR UL grant.

TABLE 1

Modified RAR UL grant to indicate repetition level of Msg3 PUSCH transmission: Option 1

| RAR grant field | Number of bits |
| --- | --- |
| Frequency hopping flag | 1 |
| PUSCH frequency resource allocation | 14 |
| PUSCH time resource allocation | 4 |
| MCS | 2 |
| Aggregation factor | 2 |
| TPC command for PUSCH | 3 |
| CSI request | 1 |

In another example, assuming a 2-bit indicator for the repetition level of the Msg3 PUSCH transmission, the number of bits for the MCS field may be reduced from 4 to 3. Further, the Channel State Information (CSI) request field may be removed from the RAR UL grant. The remaining 2-bit indicator can be used for the repetition level indication of the Msg3 PUSCH transmission, as shown in Table 2.

TABLE 2

Modified RAR UL grant to indicate repetition level of Msg3 PUSCH transmission: Option 2

| RAR grant field | Number of bits |
| --- | --- |
| Frequency hopping flag | 1 |
| PUSCH frequency resource allocation | 14 |
| PUSCH time resource allocation | 4 |
| MCS | 3 |
| Aggregation factor | 2 |
| TPC command for PUSCH | 3 |

In another example, assuming a 2-bit indicator for the repetition level of the Msg3 PUSCH transmission, the number of bits for the MCS field may be reduced from 4 to 3. Further, the Transmit Power Control (TPC) command for the PUSCH can be reduced from 3 to 2 bits. In this case, the remaining 2-bit indicator can be used for the repetition level indication of the Msg3 PUSCH transmission, as shown in Table 3.

TABLE 3

Modified RAR UL grant to indicate repetition level of Msg3 PUSCH transmission: Option 3

| RAR grant field | Number of bits |
| --- | --- |
| Frequency hopping flag | 1 |
| PUSCH frequency resource allocation | 14 |
| PUSCH time resource allocation | 4 |
| MCS | 3 |
| Aggregation factor | 2 |
| TPC command for PUSCH | 2 |
| CSI request | 1 |

In another example, assuming a 2-bit indicator for the repetition level of the Msg3 PUSCH transmission, the number of bits for the PUSCH frequency resource allocation may be reduced from 14 to 12. In this case, the remaining 2-bit indicator can be used for the repetition level indication of the Msg3 PUSCH transmission, as shown in Table 4.

TABLE 4

Modified RAR UL grant to indicate repetition level of Msg3 PUSCH transmission: Option 4

| RAR grant field | Number of bits |
| --- | --- |
| Frequency hopping flag | 1 |
| PUSCH frequency resource allocation | 12 |
| PUSCH time resource allocation | 4 |
| MCS | 4 |
| Aggregation factor | 2 |
| TPC command for PUSCH | 3 |
| CSI request | 1 |

In another option, assuming a 2-bit indicator for the repetition level of the Msg3 PUSCH transmission, the number of bits for the PUSCH time resource allocation may be reduced from 4 to 3 or 2. Further, the TPC command for the PUSCH can be reduced from 3 to 2 bits. In this case, the remaining 2-bit indicator can be used for the repetition level indication of the Msg3 PUSCH transmission, as shown in Table 5. In this case, for time domain resource allocation, only a duration with 12 or 14 symbols may be used for the transmission of the Msg3 PUSCH, which can help improve the coverage.

TABLE 5

Modified RAR UL grant to indicate repetition level of Msg3 PUSCH transmission: Option 5

| RAR grant field | Number of bits |
| --- | --- |
| Frequency hopping flag | 1 |
| PUSCH frequency resource allocation | 14 |
| PUSCH time resource allocation | 3 |
| MCS | 4 |
| Aggregation factor | 2 |
| TPC command for PUSCH | 2 |
| CSI request | 1 |

In another embodiment, the default table for PUSCH time domain resource allocation (TDRA) can be updated to include one additional field to indicate the repetition level of the Msg3 PUSCH transmission. Further, one row that includes a duration of 12 or 14 symbols may be used for the transmission of the Msg3 PUSCH, which can help improve the coverage.

Note that the above options can also be applied for the transmission of a PUSCH that is scheduled by the fallback-RAR in the MsgB for 2-step RACH procedure. As defined in Rel-16, the same content is defined for the fallbackRAR in the MsgB for the 2-step RACH and the RAR in the Msg2 for the 4-step RACH.

In another embodiment, for Msg3 PUSCH retransmissions that are scheduled by a DCI format 0_0 with a Cyclic Redundancy Error (CRC) scrambled by a temporary cell—Radio Network Temporary Identifier (TC-RNTI), the aggregation factor of a Msg3 PUSCH retransmission may be predefined in the specification or configured by higher layers via RMSI (SIB1), OSI or RRC signaling, or dynamically in the DCI, or a combination thereof.

In one option, a set of aggregation factors can be configured by a RMSI for a Msg3 retransmission. Further, a new field in the DCI format 0_0 with a CRC scrambled by the TC-RNTI can be used to indicate one aggregation factor for a Msg3 retransmission from the set of aggregation factors.

In another option, a set of repetition levels can be configured by the RMSI for a Msg3 retransmission. Further, an existing field in the DCI format 0_0 with the CRC scrambled by the TC-RNTI can be repurposed to indicate one aggregation factor for a Msg3 retransmission from the set of aggregation factors.

In one example, in the DCI format 0_0 with the CRC scrambled by the TC-RNTI, "New data indicator" and/or "HARQ process number" fields, which are reserved, can be repurposed to indicate the one aggregation factor for a Msg3 retransmission from the set of aggregation factors. For instance, 2 LSB of the "HARQ process number" field may be used to indicate the aggregation factor for the Msg3 retransmission.

In yet another option, the aggregation level of a Msg3 retransmission may follow the aggregation level of a Msg3 PUSCH indicated by the RAR UL grant and/or fallbackRAR UL grant. In this case, the aggregation level may not be included in the DCI format 0_0 with the CRC scrambled by the TC-RNTI.

In yet another option, the aggregation level of a Msg3 retransmission may be indicated as part of a time domain resource allocation (TDRA) table, which can be configured by higher layers via RMSI or predefined in the specification. In particular, one column can be included in Table 6.1.2.1.1-2 and Table 6.1.2.1.1-3 in TS38.214 to indicate the aggregation level of the Msg3 retransmission. Further, the PUSCH time resource allocation in the DCI format 0_0 with the CRC scrambled by the TC-RNTI can be used to indicate the time domain resource allocation including the aggregation level of the Msg3 retransmission.

In another embodiment, inter-slot frequency hopping can be used for a Msg3 PUSCH repetition scheduled by a RAR UL grant and/or fallbackRAR UL grant or for a Msg3 PUSCH retransmission with repetition.

In one option, whether inter-slot frequency hopping or intra-slot frequency hopping is applied for a Msg3 PUSCH repetition can be configured by higher layers via RMSI (SIB1), OSI or RRC signaling. Note that only one of intra-slot and inter-slot frequency hopping can be configured for a Msg3 PUSCH repetition.

In this case, when inter-slot frequency hopping is configured by higher layers, if the value of the "Frequency hopping flag" in the RAR UL grant and/or fallbackRAR UL grant and/or DCI format 0_0 with the CRC scrambled by the TC-RNTI is 0, the UE transmits the Msg3 PUSCH repetition without frequency hopping: while if the value of the "Frequency hopping flag" is 1, the UE transmits the PUSCH repetition with inter-slot frequency hopping.

In another option, one or more existing field in the RAR UL grant and/or fallbackRAR UL grant or DCI format 0_0 with the CRC scrambled by the TC-RNTI can be repurposed to indicate that inter-slot frequency hopping is enabled for the Msg3 PUSCH repetition. In yet another option, one new field may be included in the DCI format 0_0 with the CRC scrambled by the TC-RNTI can be included to indicate that inter-slot frequency hopping is enabled for the Msg3 PUSCH repetition.

Note that when enhanced inter-slot frequency hopping is defined and employed for a Msg3 PUSCH repetition, e.g., a PUSCH transmission occupies the same frequency resource for N slots before it switches to other frequency resources, the aforementioned options can be applied to indicate the enhanced inter-slot frequency hopping for the Msg3 PUSCH repetition. Further, the value N may be configured by higher layers via RMSI (SIB1), OSI or RRC signaling.

In another embodiment, a PUSCH repetition type A and/or B may be used for a Msg3 PUSCH repetition scheduled by a RAR UL grant and/or fallbackRAR UL grant or for a Msg3 PUSCH retransmission with repetition.

In one option, whether a PUSCH repetition type A or type B is applied for a Msg3 PUSCH repetition can be configured by higher layers via RMSI (SIBI), OSI or RRC signaling. Note that only one of PUSCH repetition type A and type B can be configured for a Msg3 PUSCH repetition.

Note that when PUSCH repetition type B is configured for a Msg3 PUSCH repetition, whether inter-slot frequency hopping or inter-repetition frequency hopping is applied for a Msg3 PUSCH repetition can be configured by higher layers via RMSI (SIBI), OSI or RRC signalling or indicated in a RAR UL grant and/or fallbackRAR UL grant or DCI format 0_0 with the CRC scrambled by the TC-RNTI.

In one embodiment, different PRACH resources may be used to indicate the coverage status of the UE. Accordingly, a UE may interpret the UL grant in the RAR in response to a PRACH transmission as per Rel-15, or re-interpret it to determine the number of repetitions for the PUSCH carrying Msg3. In one option, different PRACH resource or PRACH occasions may be configured by the RMSI for a coverage enhanced UE and for a normal UE (e.g., following Rel-15 and Rel-16 configurations) for 2-step and 4-step RACH procedure, respectively. In another option, shared PRACH occasions, but different preamble sequences may be configured by the RMSI for a coverage enhanced UE and normal UE for the 2-step and 4-step RACH procedure, respectively.

In another option, a coverage enhanced UE may only employ the 4-step RACH procedure for random access.

In another embodiment, the repetition level of a Msg3 PUSCH transmission can be determined in accordance with the repetition level applied for the transmission of the PRACH preamble or measured Reference Signal Receive Power (RSRP).

In one option, two sets of repetition levels for a Msg3 PUSCH transmission can be predefined or configured by higher layers via SIBI/RMSI. Further, which one set of repetition levels is selected depends on the coverage enhancement level or the repetition level of the PRACH transmission or the measured RSRP. Subsequently, one field in the RAR may be used to indicate the repetition level of the Msg3 PUSCH from the selected one set of repetition level. If the repetition level of a PRACH transmission is less than or equal to a configured or predefined threshold, or the measured RSRP is larger than or equal to a configured or predefined threshold, one repetition level is indicated via the RAR from the first set of repetition levels for the Msg3 PUSCH: if the repetition level of the PRACH transmission is larger than a configured or predefined threshold, or the measured RSRP is less than or equal to a configured or predefined threshold, another repetition is indicated via the RAR from the second set of repetition levels for the Msg3 PUSCH.

The above examples can be extended to the case when more than 2 sets of repetition levels or coverage enhancement levels are defined for the Msg3 PUSCH, including the case when a "coverage enhancement level" may correspond to a transmission without repetitions, e.g., following Rel-15 specifications.

In another option, a one to one mapping between the repetition level of the PRACH preamble and Msg3 PUSCH transmission can be specified. In other words, the repetition level of the Msg3 PUSCH transmission can be implicitly determined in accordance with the repetition level of the PRACH preamble and the one to one mapping rule.

In another embodiment, multiple default tables for a PUSCH time domain resource allocation (TDRA) may be predefined. Each default table may be associated with one or more of configurations of the PRACH preamble, which could include the repetition level, time/frequency resource or sequence of PRACH preamble, etc. For each row of a default table, multiple repetitions of the PUSCH may be respectively configured. Different rows may have different number of repetitions. Different default tables may have different configurations. In a default table, one column could be added to indicate the number of repetitions for each row. Alternatively, multiple Start and Length Indicator Values (SLIVs) for the multiple PUSCHs of a row may be respectively preconfigured or configured by higher layers via RMSI. Further, one row that includes a duration of 12 or 14 symbols may be used for transmission of the Msg3 PUSCH, which can help improve the coverage.

Coverage Enhancement for PUCCH Carrying HARQ-ACK of Msg4

As above, uplink coverage is typically the bottleneck considering the low transmit power at the UE side. In such cases, the embodiments herein may help improve the coverage of a PUCCH carrying a HARQ-ACK of Msg4 transmissions.

In Rel-15 NR, for initial access, a physical uplink control channel (PUCCH) resource set, which consists of 256 PUCCH resources, is predefined in the specification. Further, a 4-bit field (pucch-ResourceCommon) in the NR remaining minimum system information (RMSI) is used to indicate 16 cell specific PUCCH resources.

For initial access, (e.g., HARQ-ACK feedback for the corresponding Msg4 transmission in the conventional 4-step RACH procedure) or for a UE that is not provided with a dedicated PUCCH resource configuration, the PUCCH resource indicator (PRI) in the DCI and starting control channel element (CCE) of the corresponding physical downlink control channel (PDCCH) are used to determine a PUCCH resource from the 16 resources for carrying the 1-bit HARQ-ACK feedback.

Embodiments for coverage enhancement for a PUCCH carrying a HARQ-ACK of Msg4 are provided as follows. Note that the following embodiments can also apply to the case when the UE is not provided a dedicated PUCCH resource set or PUCCH configuration, and for the transmission of a PUCCH carrying a HARQ-ACK feedback of MsgB with successRAR.

In one embodiment, a repetition level of the PUCCH carrying HARQ-ACK response of Msg4 can be predefined or configured by a higher layer via MSI, RMSI, OSI or RRC signaling, or dynamically indicated in the DCI format 1_0 for scheduling Msg4, by a MAC CE of Msg4, or a combination thereof.

In one option, a set of repetition levels for a PUCCH carrying a HARQ-ACK response of Msg4 can be predefined or configured by SIB1 or the RMSI, e.g., {2, 4, 8, 16}. Then, the 2-bit field in the DCI for scheduling Msg4 can be used to indicate which repetition level is used for the transmission of the PUCCH. Alternatively, two bits in a MAC CE of Msg4 can be used to indicate which repetition level is used for the transmission of the PUCCH.

As a further extension, to keep the same size of DCI format 1_0, some fields in the DCI format 1_0 for scheduling Msg4 may be repurposed to indicate the repetition level of the PUCCH carrying the HARQ-ACK response.

In one example, the "Modulation and coding scheme" field in the DCI format 10 may be reduced from 5 to 3 bits. In this case, the remaining 2 bits can be used for the repetition level of the PUCCH carrying the HARQ-ACK response.

In another example, the "TPC command for scheduled PUCCH" may be reduced from 2 to 1 bit and the "Modulation and coding scheme" field in the DCI format 1_0 may be reduced from 5 to 4 bits. In this case, the remaining 2 bits can be used for the repetition level of the PUCCH carrying the HARQ-ACK response.

In another embodiment, a repetition level of the PUCCH carrying the HARQ-ACK response of Msg4 can be configured via pucch-ResourceCommon. In particular, the cell specific PUCCH resource set may include one field which indicates the repetition level of the PUCCH carrying the HARQ-ACK response of Msg4.

In one option, one column for the cell specific PUCCH resource set may be included to indicate the repetition level of the PUCCH carrying the HARQ-ACK response of Msg4. Different PUCCHs in the cell specific PUCCH resource set may have same or different repetition levels.

In another option, another PUCCH resource set may be configured for the coverage enhanced UEs, where the measured RSRP is less than a predefined or configured threshold. In the another PUCCH resource set, only PUCCH format 1 is included and the repetition level of the PUCCH carrying the HARQ-ACK response of Msg4 is included. Further, a PUCCH format 1 with duration of 12 or 14 symbols may be included in the new PUCCH resource set.

Note that repetition may only be applied for certain formats. e.g., PUCCH format 1, 3 and/or 4. For initial access, the repetition can be applied only for PUCCH format 1.

In another embodiment, the repetition level of the PUCCH carrying the HARQ-ACK response of Msg4 can be determined in accordance with that of the PRACH preamble and/or that of Msg4 transmission and/or Msg3 PUSCH transmission for the contention based 4-step RACH procedure, or a combination thereof.

In one example, a set of values for the repetition level of PUCCH transmissions can be predefined in the specification and one value from the set of values can be configured by higher layers via SIB1/RMSI or dynamically indicated in the DCI format 1_0 for scheduling Msg4 to indicate the repetition level of PUCCH carrying HARQ-ACK response of Msg4.

In another example, the repetition level of the PUCCH carrying the HARQ-ACK response of Msg4 can be determined in accordance with the repetition level of the PRACH transmission or the measured RSRP value. In one example, two sets of repetition levels of the PUCCH carrying the HARQ-ACK response of Msg4 can be predefined in the specification, which correspond to different coverage enhancement level or the repetition levels of the PRACH transmission. Further, if the repetition level of the PRACH transmission is less than or equal to a configured or predefined threshold or the measured RSRP is larger than or equal to a configured or predefined threshold, one repetition level is configured via SIB1 or RMSI from the first set of repetition levels for the PUCCH carrying the HARQ-ACK response of Msg4; if the repetition level of the PRACH transmission is larger than a configured or predefined threshold or the measured RSRP is less than or equal to a configured or predefined threshold, another repetition level is configured via SIBI or RMSI from the second set of repetition levels for the PUCCH carrying the HARQ-ACK response of Msg4.

Note that the above example can be extended to the case when more than 2 set of repetition levels or coverage enhancement levels are defined for the PUCCH carrying the HARQ-ACK response of Msg4, including fallback to the case of transmission without any repetitions.

In another example, one to one mapping between the repetition level of the PRACH preamble and/or Msg4 transmission and/or Msg3 PUSCH transmission, and the PUCCH carrying the HARQ-ACK response of Msg4 can be specified. In other words, the repetition level of the PUCCH carrying the HARQ-ACK response of Msg4 can be implicitly determined in accordance with the repetition level of the PRACH preamble and/or Msg4 transmission and/or Msg3 PUSCH transmission and the one to one mapping rule.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for user equipment (UE) configured for operation in a fifth-generation (5G) new-radio (5G-NR) system, the apparatus comprising: processing circuitry; and memory, the processing circuitry configured to perform a random access procedure comprising:
    configuring the UE for transmission of a random access preamble (Msg1) in a physical random access channel (PRACH);
    configuring the UE for reception of a random access response (RAR) message (Msg2) in response to transmission of the random access preamble (Msg1), the RAR message (Msg2) including an RAR uplink (UL) grant; and
    configuring the UE for an initial transmission of a physical uplink shared channel (PUSCH) scheduled by the RAR UL grant,
    wherein for PUSCH repetition Type A that is scheduled by the RAR UL grant, the processing circuitry is to configure the UE to repeat the initial transmission of the PUSCH over a number of slots based on a Msg3 PUSCH repetition number,
    wherein when the PUSCH repetition Type A that is scheduled by the RAR UL grant, the processing circuitry is configured to determine the Msg3 PUSCH repetition number from two most significant bits in a modulation and coding scheme (MCS) field of the RAR UL grant, the MCS for the PUSCH determined from least-significant bits in the MCS field,
    wherein when the PUSCH repetition Type A is scheduled by a downlink control information (DCI) format 0_1, the processing circuitry is to configure the UE to repeat the initial transmission of the PUSCH based on a PUSCH aggregation factor received via radio resource control (RRC) signalling, and
    wherein the memory is configured to store the random access preamble.

2. The apparatus of claim 1, wherein for PUSCH repetition Type A that is scheduled by the RAR UL grant when the UE is configured for frequency hopping by a frequency hopping flag of the RAR UL grant, the processing circuitry is to configure the UE to perform inter-slot frequency hopping for the Msg3 PUSCH repetition.

3. The apparatus of claim 2, wherein the DCI format 0_1 is received in a physical downlink control channel (PDCCH) with cyclic redundancy code (CRC) scrambled by a Radio Network Temporary Identifier (RNTI).

4. The apparatus of claim 3, wherein for transmission of the PUSCH with PUSCH repetition TYPE A that is scheduled by a DCI format 0_0 with CRC scrambled by a Temporary Cell RNTI (TC-RNTI), the processing circuitry is to configure the UE to repeat the transmission of the PUSCH over a number of slots based on a Msg3 PUSCH repetition number determined from two bits in a field of the DCI format 0_0.

5. The apparatus of claim 4, wherein the processing circuitry is configured to determine different PRACH occasions to use for transmission of the PRACH to indicate different coverage statuses based on remaining minimum system information (RMSI).

6. The apparatus of claim 1, wherein the wherein the processing circuitry includes a baseband processor.

7. A non-transitory computer-readable storage medium that stores instructions for execution by processing circuitry of a user equipment (UE), the processing circuitry configured to perform a random access procedure comprising:
configuring the UE for transmission of a random access preamble (Msg1) in a physical random access channel (PRACH);
configuring the UE for reception of a random access response (RAR) message (Msg2) in response to transmission of the random access preamble (Msg1), the RAR message (Msg2) including an RAR uplink (UL) grant; and
configuring the UE for an initial transmission of a physical uplink shared channel (PUSCH) scheduled by the RAR UL grant,
wherein for PUSCH repetition Type A that is scheduled by the RAR UL grant, the processing circuitry is to configure the UE to repeat the initial transmission of the PUSCH over a number of slots based on a Msg3 PUSCH repetition number, and
wherein when the PUSCH repetition Type A that is scheduled by the RAR UL grant, the processing circuitry is configured to determine the Msg3 PUSCH repetition number from two most significant bits in a modulation and coding scheme (MCS) field of the RAR UL grant, the MCS for the PUSCH determined from least-significant bits in the MCS field, and
wherein when the PUSCH repetition Type A is scheduled by a downlink control information (DCI) format 0_1, the processing circuitry is to configure the UE to repeat the initial transmission of the PUSCH based on a PUSCH aggregation factor received via radio resource control (RRC) signalling.

8. The non-transitory computer-readable storage medium of claim 7, wherein for PUSCH repetition Type A that is scheduled by the RAR UL grant when the UE is configured for frequency hopping by a frequency hopping flag of the RAR UL grant, the processing circuitry is to configure the UE to perform inter-slot frequency hopping for the Msg3 PUSCH repetition.

9. The non-transitory computer-readable storage medium of claim 8, wherein the DCI format 0_1 is received in a physical downlink control channel (PDCCH) with cyclic redundancy code (CRC) scrambled by a Radio Network Temporary Identifier (RNTI).

10. The non-transitory computer-readable storage medium of claim 9, wherein for transmission of the PUSCH with PUSCH repetition TYPE A that is scheduled by a DCI format 0_0 with CRC scrambled by a Temporary Cell RNTI (TC-RNTI), the processing circuitry is to configure the UE to repeat the transmission of the PUSCH over a number of slots based on a Msg3 PUSCH repetition number determined from two bits in a field of the DCI format 0_0.

11. The non-transitory computer-readable storage medium of claim 10, wherein the processing circuitry is configured to determine different PRACH occasions to use for transmission of the PRACH to indicate different coverage statuses based on remaining minimum system information (RMSI).

12. A non-transitory computer-readable storage medium that stores instructions for execution by processing circuitry of gNodeB (gNB), wherein to perform a random access procedure with a user equipment (UE), the processing circuitry is configured to:
decode random access preamble (Msg1) in a physical random access channel (PRACH) from the UE;
encode a random access response (RAR) message (Msg2) in response to the random access preamble (Msg1), the RAR message (Msg2) including an RAR uplink (UL) grant; and
decode an initial transmission of a physical uplink shared channel (PUSCH) scheduled by the RAR UL grant,
wherein for PUSCH repetition Type A that is scheduled by the RAR UL grant, the processing circuitry is decode repetitions of the initial transmission of the PUSCH over a number of slots based on a Msg3 PUSCH repetition number, and
wherein when the PUSCH repetition Type A that is scheduled by the RAR UL grant, the processing circuitry is configured to indicate to the UE the Msg3 PUSCH repetition number in two most significant bits in a modulation and coding scheme (MCS) field of the RAR UL grant, the MCS for the PUSCH determined from the least-significant bits in the MCS field,
wherein for PUSCH repetition Type A that is scheduled by a downlink control information (DCI) format 0_1, the processing circuitry is to encode radio resource control (RRC) signalling with a PUSCH aggregation factor for transmission to the UE to configure the UE to repeat the initial transmission of the PUSCH, and
wherein memory is configured to store the random access preamble.

13. The non-transitory computer-readable storage medium of claim 12, wherein for PUSCH repetition Type A that is scheduled by the RAR UL grant when the UE is configured for frequency hopping by a frequency hopping flag of the RAR UL grant, the processing circuitry is to configure the UE to perform inter-slot frequency hopping for the Msg3 PUSCH repetition by setting the frequency hopping flag of the RAR UL grant.

14. The non-transitory computer-readable storage medium of claim 13, wherein the processing circuitry is configured to transmit the DCI format 0_1 in a physical downlink control channel (PDCCH) with a cyclic redundancy code (CRC) scrambled by a Radio Network Temporary Identifier (RNTI).

15. The non-transitory computer-readable storage medium of claim 14, wherein for PUSCH repetition TYPE A that is scheduled by a DCI format 0_0 with CRC scrambled by a Temporary Cell RNTI (TC-RNTI), the processing circuitry is to encode the DCI format 0_0 to configure the UE to repeat the transmission of the PUSCH over a number of slots based on a Msg3 PUSCH repetition number indicated in two bits in a field of the DCI format 0_0.

* * * * *

UNITED STATES PATENT AND TRADEMARK OFFICE
CERTIFICATE OF CORRECTION

| | | |
|---|---|---|
| PATENT NO. | : 11,903,034 B2 | Page 1 of 1 |
| APPLICATION NO. | : 17/180034 | |
| DATED | : February 13, 2024 | |
| INVENTOR(S) | : Xiong et al. | |

It is certified that error appears in the above-identified patent and that said Letters Patent is hereby corrected as shown below:

On the Title Page

Item (57), in "Abstract", in Column 2, Line 1, delete "Msg 3" and insert --Msg3-- therefor In the Claims In Column 18, Line 22, in Claim 1, after "comprising:", insert a linebreak In Column 18, Line 22, in Claim 1, after "and", insert a linebreak In Column 19, Line 12, in Claim 6, delete "wherein the wherein the" and insert --wherein the-- therefor Signed and Sealed this
Eighteenth Day of March, 2025

Coke Morgan Stewart
*Acting Director of the United States Patent and Trademark Office*